United States Patent
Thomas

(10) Patent No.: US 6,173,985 B1
(45) Date of Patent: Jan. 16, 2001

(54) TRAILER HITCH ASSEMBLY WITH AN INTERCHANGEABLE BALL

(75) Inventor: William J. Thomas, Riverview, MI (US)

(73) Assignee: Valley Industries LLC, Lodi, CA (US)

( * ) Notice: Under 35 U.S.C. 154(b), the term of this patent shall be extended for 0 days.

(21) Appl. No.: 09/258,979

(22) Filed: Feb. 26, 1999

(51) Int. Cl.[7] ........................................ B60D 1/06
(52) U.S. Cl. ..................... 280/511; 280/491.1; 403/11
(58) Field of Search ............... 280/414.2, 414.1, 280/511, 491.5, 504, 400, 29; 114/344; 403/11, 12, 154, 155; 24/585

(56) References Cited

U.S. PATENT DOCUMENTS

| | | | |
|---|---|---|---|
| D. 285,287 | * 8/1986 | Tannar | D9/434 |
| 3,922,006 | 11/1975 | Borges . | |
| 3,963,266 | 6/1976 | Thelin . | |
| 4,433,854 | 2/1984 | Smith . | |
| 4,434,996 | 3/1984 | Wallace . | |
| 4,568,098 | 2/1986 | Landry, Jr. . | |
| 4,596,406 | 6/1986 | Van Vleet et al. | 280/511 |
| 4,844,498 | 7/1989 | Kerins et al. . | |
| 4,889,356 | 12/1989 | Morris . | |
| 4,938,496 | * 7/1990 | Thomas et al. | 280/511 |
| 4,989,892 | 2/1991 | Kerins et al. . | |
| 5,116,072 | 5/1992 | Swenson . | |
| 5,290,057 | 3/1994 | Pellerito . | |
| 5,419,576 | * 5/1995 | Van Vleet | 280/507 |
| 5,511,814 | * 4/1996 | Floyd | 280/507 |
| 5,975,553 | 11/1999 | Van Vleet . | |

OTHER PUBLICATIONS

Titan Industries, "Adapt Hitch Ball, Interchangeable Trailer Hitch Ball System," Brochure, Wyandotte, Michigan 48192.

* cited by examiner

Primary Examiner—Brian L. Johnson
Assistant Examiner—Daniel Yeagley
(74) Attorney, Agent, or Firm—Rader, Fishman & Grauer PLLC

(57) ABSTRACT

A trailer hitch assembly includes an interchangeable ball having a first bore for removably receiving a stub shaft attached to the towing vehicle. Both the ball and stub shaft have transverse bores that can be aligned with one another to receive a removable pin for securing the ball to the stub shaft during normal use. When the ball is not on the stub shaft, a clip can be inserted into the first bore of the ball to removably engage the pin and prevent the pin from being withdrawn from the ball. This feature helps to prevent the pin from becoming lost or misplaced while the ball is in storage.

11 Claims, 3 Drawing Sheets

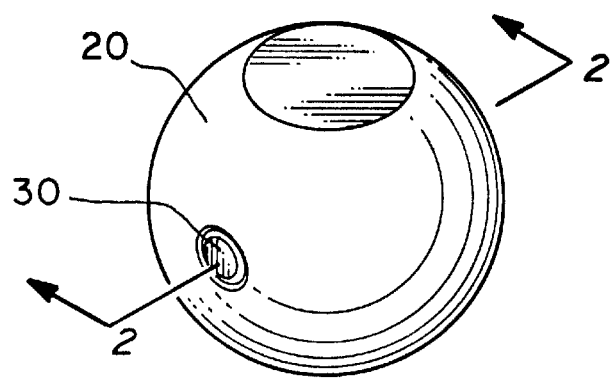
Fig. 1
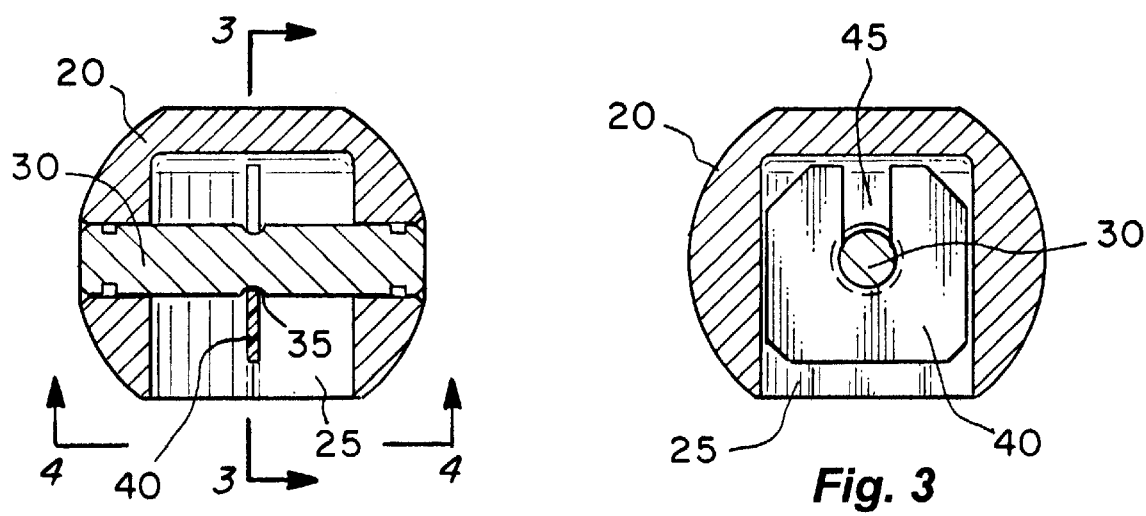
Fig. 2
Fig. 3
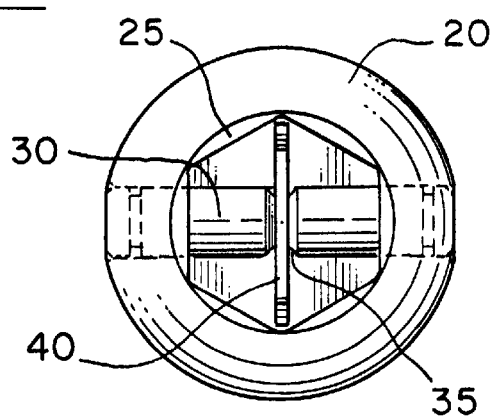
Fig. 4

TRAILER HITCH ASSEMBLY WITH AN INTERCHANGEABLE BALL

BACKGROUND OF THE INVENTION

1. Field of the Invention

The present invention relates generally to the field of trailer hitch balls. More specifically, the present invention discloses a trailer hitch ball assembly that uses a removable clip to hold the fastening pin in the ball while the ball is not in use.

2. Statement of the Problem

Various types of trailer hitches have been used for many years. One common type of trailer hitch uses a generally spherical metal ball mounted on a stub shaft extending upward from a member attached to the towing vehicle. A corresponding hitch socket assembly carried by the trailer is coupled to the ball to connect the trailer to the towing vehicle.

Unfortunately, several different trailer hitch ball sizes have come into common usage, resulting in incompatibility problems. Several approaches have been used in the past to allow balls of various sizes to be substituted interchangeably. For example, the "Adapt Hitch Ball" hitch marketed by Titan Industries, Inc. of Wyandotte, Mich., employs a ball with a vertical hexagonal bore that receives a corresponding hexagonal stub shaft. Transverse bores extend through both the ball and shaft. After the ball has been placed over the shaft with the transverse bores in proper alignment with one another, a removable pin is inserted through the transverse bores to secure the ball to the shaft. This allows balls of different sizes to be quickly and easily substituted by removing the pin, lifting the ball of the stub shaft, placing a different ball on the shaft, and reinserting the pin through the ball and shaft. However, the pin is relatively small and can be easily misplaced or lost when it is removed from the ball. This is particularly a problem while extra balls are in storage, since each ball is usually equipped with its own pin.

One approach to this problem is disclosed in U.S. Pat. No. 4,596,406 (Van Vleet et al.). Van Vleet et al. include retention means in the transverse bore of the ball to prevent the pin from being completely withdrawn from the ball. This keeps the pin from becoming lost, but adds complexity and increases manufacturing costs.

SOLUTION TO THE PROBLEM

The present invention solves the shortcomings associated with the prior art discussed above by employing a removable clip to hold the pin in the ball while the ball is not being used on the stub shaft. This clip can be very inexpensive and prevents the pin from becoming lost or misplaced while the ball is in storage.

SUMMARY OF THE INVENTION

This invention provides a trailer hitch assembly with an interchangeable ball having a first bore for removably receiving a stub shaft attached to the towing vehicle. Both the ball and stub shaft have transverse bores that can be aligned with one another to receive a removable pin for securing the ball to the stub shaft during normal use. When the ball is not on the stub shaft, a clip can be inserted into the first bore of the ball to removably engage the pin and prevent the pin from being withdrawn from the ball.

A primary object of the present invention is to provide a trailer hitch assembly with an interchangeable ball that reduces the chance that the pin might become lost or misplaced while the ball is in storage.

Another object of the present invention is to provide a trailer hitch assembly with an interchangeable ball that can be manufactured inexpensively and is easy to use.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 1 is a top perspective view of the trailer hitch ball 20 with a removable pin 30 inserted into the transverse bore of the ball 20.

FIG. 2 is a cross-sectional view of the ball 20, pin 30, and clip 40.

FIG. 3 is another cross-sectional view of the ball 20, pin 30, and clip 40 taken along a plane orthogonal to the cross-sectional view in FIG. 2.

FIG. 4 is a bottom view of the ball 20, pin 30, and clip 40 corresponding to FIGS. 2 and 3.

DETAILED DESCRIPTION OF THE INVENTION

Figure 5:
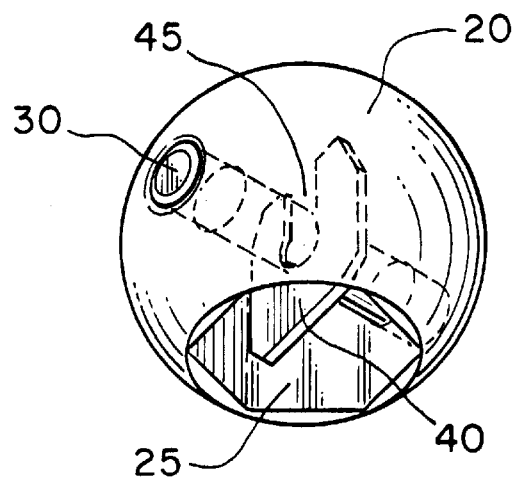
FIG. 5 is a bottom perspective view of the ball 20 showing the pin 30 and clip 40 in hidden lines.

Turning to FIG. 1, a top perspective view is shown of a trailer hitch ball 20. As previously discussed, the ball 20 is intended for use as part of a trailer hitch assembly having a stub shaft 15, as illustrated in the cross-sectional view provided in FIG. 7. The stub shaft 15 is bolted to a horizontal member 10 secured to the frame or bumper of the towing vehicle. The stub shaft 15 also has a transverse bore 18 extending horizontally through it.

Any of a series of balls 20 having a range of outside diameters can be mounted interchangeably on the stub shaft 15 to accommodate trailer hitch sockets of different sizes. Each ball 20 has a first bore 25 for receiving the stub shaft 15. For example, if the stub shaft 15 has a hexagonal cross-section as shown in the accompanying drawings, the first bore 25 would also have a hexagonal cross-section with slightly larger dimensions to enable the ball 20 to be removably placed over the stub shaft 15 when in use. The ball is also equipped with a transverse bore 28 (shown most clearly in FIG. 6) that can be aligned with the transverse bore 18 of the stub shaft 15.

Figure 7:
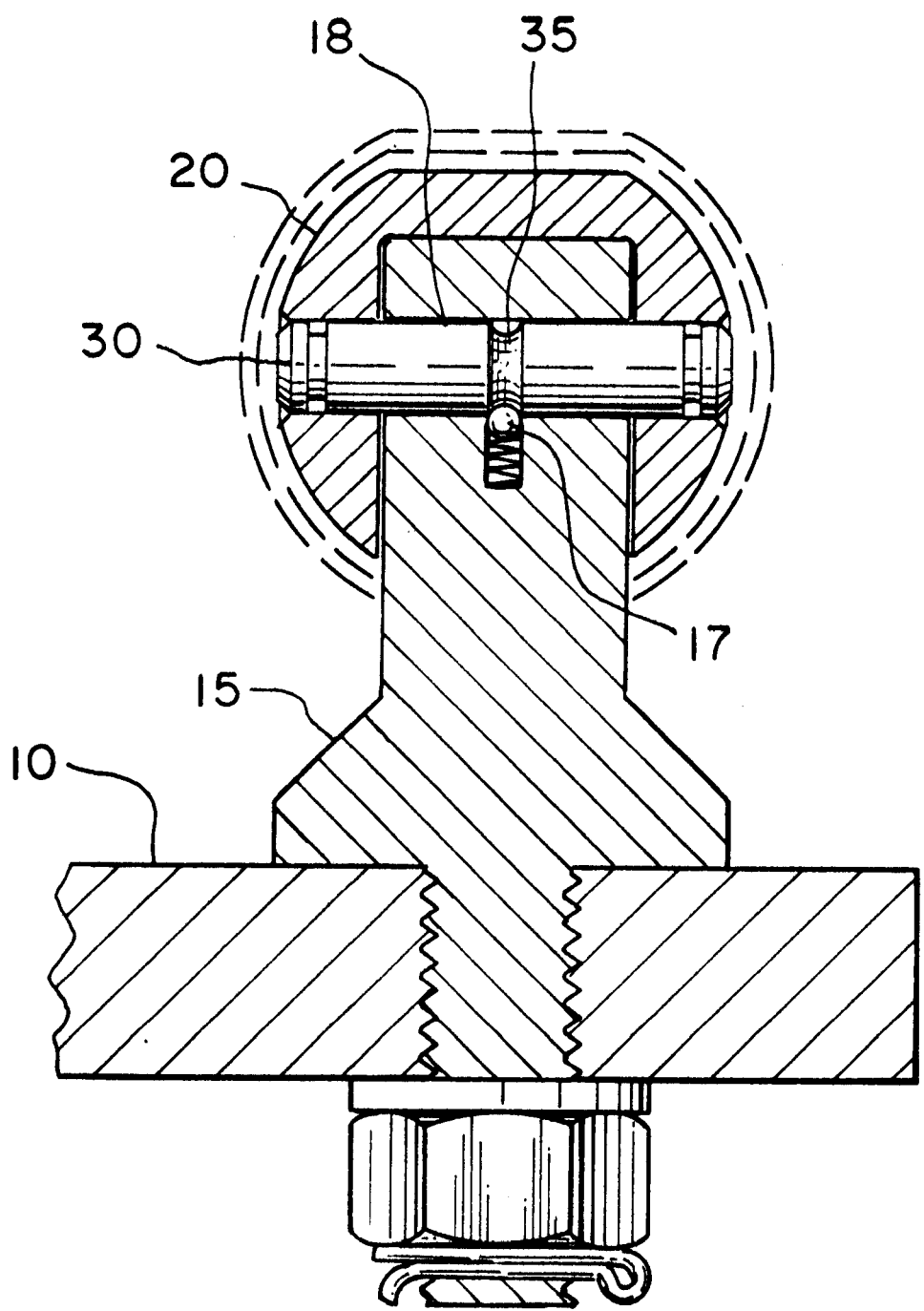
FIG. 7 is a cross-sectional view of the ball 20 attached to the stub shaft 15.

After the ball 20 has been mounted over the stub shaft 15, it is held in place by inserting a removable pin 30 into the transverse bores 28 and 18 of the ball 20 and stub shaft 15 as depicted in the cross-sectional views in FIG. 7. The length of the pin 30 is selected to be slightly less than the diameter of the ball 20, so that the ends of the pin 30 will not extend beyond the outer surface of the ball 20 and possibly interfere with proper operation of the hitch assembly.

In one embodiment, an annular recess 35 extends around the middle portion of the pin 30. A pin/spring mechanism 17 within transverse bore 18 of the stub shaft 15 engages this annular recess 35, as shown in FIG. 7, to help retain the pin 30 during normal use.

Figure 6:
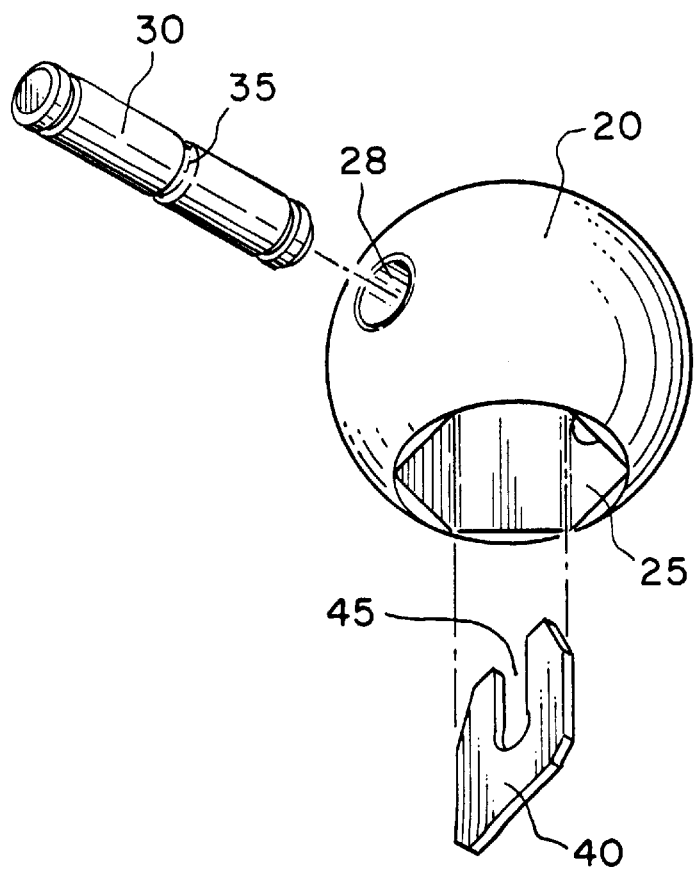
FIG. 6 is an exploded perspective view corresponding to FIG. 5.

To remove the ball 20, the user exerts a lateral force on one of the exposed ends of the pin 30 to overcome the retention force exerted by the pin/spring mechanism 17 on the annular recess 35, and thereby cause the pin 30 to slide relative to the ball 20 and stub shaft. The user can then grab the exposed end of the pin 30 and pull it completely out of the ball 20, as shown in FIG. 6. A different ball 20 can then be placed over the stub shaft 15 and secured with its pin 30, as described above.

Once the ball 20 has been removed from the stub shaft 15, the pin 30 is reinserted loosely into its transverse bore 28, as depicted in FIGS. 2 through 5. A removable clip 40 is inserted into the first bore 25 of the ball 20 to engage the annular recess 35 of the pin 30. In the embodiment shown in the drawings, the clip 40 is a substantially planar piece of flexible plastic or cardboard having a slot 45 that engages the middle portion of pin 30 within the first bore 25 of the ball 20. It should be understood that other suitable materials could be readily substituted. The width of the slot 45 is selected to provide a friction fit with the pin 30, and thereby prevent axial movement of the pin 30 with respect to the ball 20 while the clip 40 is in place. Thus, the clip 40 helps to prevent the pin 30 from becoming lost or misplaced while the ball 20 is in storage.

As previously discussed, the pin 30 can include an annular recess 35 extending around the middle portion of the pin 30. The clip 40 is particularly effective in this embodiment if its dimensions are selected to engage the reduced-diameter portion of the annular recess 35. The shoulders on either side of the annular recess 35 provide further resistance to any axial movement of the clip 40 relative to the pin 30.

In the preferred embodiment of invention, the clip 40 has a length slightly smaller than the diameter of the first bore 25 of the ball 20. Any axial movement of the pin 30 quickly causes the edges of the clip 40 to contact the peripheral surfaces of the first bore 25.

A planar clip 40 has the advantages of low cost and simplicity. However, it should be understood that other types of clips could be readily substituted. For example, the clip could be a plug (with a slot) that fills a substantial portion of first bore 25 of the ball 20. Alternatively, a more complicated clip could be employed that requires the user to initially squeeze or deform the clip to make it fit over the pin.

The above disclosure sets forth a number of embodiments of the present invention. Other arrangements or embodiments, not precisely set forth, could be practiced under the teachings of the present invention and as set forth in the following claims.

I claim:

1. A trailer hitch assembly for use with a stub shaft having a transverse bore, said assembly comprising:

an interchangeable ball having a first bore for removably receiving a stub shaft, and a transverse bore in alignment with the transverse bore of the stub shaft;

a pin for removable insertion through said transverse bores of the stub shaft and said ball, thereby removably securing said ball to the stub shaft; and a removable clip for insertion into said first bore of said ball to removably engage a center portion of said pin to prevent said pin from being withdrawn from said ball when said ball is not on the stub shaft.

2. The trailer hitch assembly of claim 1 wherein said clip provides a friction fit with said pin.

3. The trailer hitch assembly of claim 1 wherein said pin further comprises a annular recess extending around a middle portion of said pin, and wherein said clip engages said annular recess on said pin.

4. The trailer hitch assembly of claim 3 wherein said clip further comprises a slot engaging said annular recess on said pin.

5. The trailer hitch assembly of claim 1 wherein said clip comprises a substantially planar piece of flexible plastic having a slot for engaging said pin.

6. The trailer hitch assembly of claim 1 wherein said clip comprises a substantially planar piece of cardboard having a slot for engaging said pin.

7. The trailer hitch assembly of claim 1, said clip having a length that extends across a diameter of said first bore, said length being slightly smaller than the diameter of said first bore, thereby preventing axial movement of said pin with respect to said ball.

8. A trailer hitch assembly for use with a stub shaft having a transverse bore, said assembly comprising:

an interchangeable ball having a first bore for removably receiving a stub shaft, and a transverse bore in alignment with the transverse bore of the stub shaft;

a pin for removable insertion through said transverse bores of the stub shaft and said ball, thereby removably securing said ball to the stub shaft; and a removable clip having a slot for removably engaging a middle portion of said pin within said first bore of said ball when said ball is not on the stub shaft, said clip having a length that extends across a diameter of said first bore, said length being slightly less than the diameter of said first bore, thereby preventing axial movement of said pin with respect to said ball.

9. The trailer hitch assembly of claim 8 wherein said pin further comprises a annular recess extending around a middle portion of said pin, and wherein said slot of said clip engages said annular recess on said pin.

10. The trailer hitch assembly of claim 8 wherein said clip comprises a substantially planar piece of flexible plastic having a slot for engaging said pin.

11. The trailer hitch assembly of claim 8 wherein said clip comprises a substantially planar piece of flexible cardboard having a slot for engaging said pin.

* * * * *